United States Patent
Cipriano et al.

(10) Patent No.: US 7,363,303 B2
(45) Date of Patent: *Apr. 22, 2008

(54) MULTI-COLUMN MULTI-DATA TYPE INTERNATIONALIZED SORT EXTENSION METHOD FOR WEB APPLICATIONS

(75) Inventors: Peter F. Cipriano, Staatsburg, NY (US); Robyn Focazio, Round Rock, TX (US); Stephen Hobbs, Woodstock, GA (US); Kumar Marappan, Round Rock, TX (US); Brent R. Phillips, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 415 days.

This patent is subject to a terminal disclaimer.

(21) Appl. No.: 10/856,392

(22) Filed: May 28, 2004

(65) Prior Publication Data

US 2005/0278327 A1 Dec. 15, 2005

(51) Int. Cl.
*G07F 17/30* (2006.01)
*G06F 15/16* (2006.01)

(52) U.S. Cl. .............................. 707/7; 707/3
(58) Field of Classification Search .................. 707/7, 707/3
See application file for complete search history.

(56) References Cited

U.S. PATENT DOCUMENTS

| | | | |
|---|---|---|---|
| 5,551,018 A * | 8/1996 | Hansen | 707/7 |
| 5,615,366 A | 3/1997 | Hansen | 395/607 |
| 5,664,206 A | 9/1997 | Murow et al. | 704/8 |
| 5,675,818 A | 10/1997 | Kennedy | 395/758 |
| 5,726,920 A | 3/1998 | Chen et al. | 364/579 |
| 6,289,334 B1 * | 9/2001 | Reiner et al. | 707/3 |
| 6,389,386 B1 | 5/2002 | Hetherington et al. | 704/8 |
| 6,460,015 B1 | 10/2002 | Hetherington et al. | 704/8 |
| 6,516,727 B2 | 2/2003 | Kraft | 104/26.1 |
| 2002/0091691 A1* | 7/2002 | Sharp | 707/7 |
| 2003/0158865 A1* | 8/2003 | Renkes et al. | 707/200 |

* cited by examiner

*Primary Examiner*—John Breene
*Assistant Examiner*—Alex Gofman
(74) *Attorney, Agent, or Firm*—Cantor Colburn LLP; Geraldine Monteleone

(57) ABSTRACT

A method for implementing a front-end user sort request includes receiving a list request, decomposing the list request and creating a sort entry object using a list of column values initially retrieved from a data storage medium. A sort routine is performed on at least a first column of the list of column values in the sort entry object, wherein a compare function of the sort routine is dependent upon information obtained from decomposing the list request. The list request is rebuilt in accordance with the completion of the sort routine.

6 Claims, 5 Drawing Sheets

FIG. 3(a)

| ROW | COL 1 | 2 | 3 |
|---|---|---|---|
| 1 | 1 | 1 | 3 |
| 2 | 1 | 1 | 2 |
| 3 | 1 | 2 | 1 |
| 4 | 2 | 2 | 4 |
| 5 | 2 | 2 | 4 |
| 6 | 2 | 3 | 3 |
| 7 | 3 | 3 | 5 |
| 8 | 3 | 3 | 4 |

- Sort ASC on Col 1
- Get 1st Subset on Col 1 (Rows 1,2,3)
- Sort Col 2 DSC
- Swap Rows 3 and 1

FIG. 3(b)

| ROW | COL 1 | 2 | 3 |
|---|---|---|---|
| 1 | 1 | 2 | 1 |
| 2 | 1 | 1 | 2 |
| 3 | 1 | 1 | 3 |
| 4 | 2 | 2 | 4 |
| 5 | 2 | 2 | 4 |
| 6 | 2 | 3 | 3 |
| 7 | 3 | 3 | 5 |
| 8 | 3 | 3 | 4 |

- Get Col 2 Subset
- Subset < 2, end
- Get next Col 2 Subset
- Swap Rows 2 and 3

FIG. 3(c)

| ROW | COL 1 | 2 | 3 |
|---|---|---|---|
| 1 | 1 | 2 | 1 |
| 2 | 1 | 1 | 3 |
| 3 | 1 | 1 | 2 |
| 4 | 2 | 2 | 4 |
| 5 | 2 | 2 | 4 |
| 6 | 2 | 3 | 3 |
| 7 | 3 | 3 | 5 |
| 8 | 3 | 3 | 4 |

- Get next Col 1 subset (Rows 4,5,6)
- Sort Col 2 DSC
- Swap Rows 6 and 4

FIG. 3(d)

| ROW | COL 1 | 2 | 3 |
|---|---|---|---|
| 1 | 1 | 2 | 1 |
| 2 | 1 | 1 | 3 |
| 3 | 1 | 1 | 2 |
| 4 | 2 | 3 | 3 |
| 5 | 2 | 2 | 4 |
| 6 | 2 | 2 | 4 |
| 7 | 3 | 3 | 5 |
| 8 | 3 | 3 | 4 |

- Get Col 2 subset
- Subset < 2, end
- Get next Col 2 subset
- Sort Col 3 DSC
- No Change

| ROW | COL 1 | 2 | 3 |
|---|---|---|---|
| 1 | 1 | 2 | 1 |
| 2 | 1 | 1 | 3 |
| 3 | 1 | 1 | 2 |
| 4 | 2 | 3 | 3 |
| 5 | 2 | 2 | 4 |
| 6 | 2 | 2 | 4 |
| 7 | 3 | 3 | 5 |
| 8 | 3 | 3 | 4 |

- Get next Col 1 Subset (Rows 7, 8)
- Sort Col 2 DSC
- Get Col 2 subset
- Sort Col 3 DSC
- No Change

FIG. 3(e)

MULTI-COLUMN MULTI-DATA TYPE INTERNATIONALIZED SORT EXTENSION METHOD FOR WEB APPLICATIONS

BACKGROUND

The present invention relates generally to database sorting methods and systems, and, more particularly, to a multi-column, multi-data type internationalized sort extension method for web applications.

Perhaps one of the most fundamental tasks to the operation of computers is sorting, which refers the process of arranging a set of similar information into a desired order. While employed in virtually all database programs, sorting routines are also extensively used in many other areas. Common examples include compilers, interpreters, and operating system software. In many instances, the quality and performance of such software is judged by the efficiency of its sorting techniques. Since sorting methodology plays such an important role in the operation of computers and other data processing systems, there has been much interest in seeking ways to improve existing systems and methods.

Historically, techniques for sorting information are divided into three general methods: exchange, selection, and insertion. To sort by exchange, a system swaps or "exchanges" out of order information until all data members are ordered. One well known example of exchange sorting is the "bubble sort," which implements repeated comparisons and attendant exchanges of adjacent members. The efficiency of a bubble sort is dependent upon the number of possible comparisons (which increases with a greater number of elements to be sorted) and the number of exchanges required by the sort (which increases the more the list to be sorted is out of order). The end result is that the execution time approaches a multiple of the square of the number of elements, making the bubble sort unusable for large sorts.

With a selection sort, a system continually chooses or "selects" a data member from one extreme of possible values (e.g., such as the lowest-value member) until all members have been selected. Because the system always selects the lowest-value member from those remaining, the set will be ordered from lowest to highest-value member when the process is completed. As is the case with a bubble sort, a selection sort is also too slow for processing a large number of items.

In a sort by insertion, the system examines a data member and places or inserts that member into a new set of members, always inserting each member in its correct position. The sort is completed once the last member has been inserted. Unlike the other two sorting techniques, the number of comparisons that occur with this technique depends on the initial order of the list. More particularly, the technique possesses "natural" behavior; that is, it works the least when the list is already sorted and vice versa, thus making it useful for lists which are almost in order. Also, the technique does not disturb the order of equal keys. If a list is sorted using two keys, the list will remain sorted for both keys after an insertion sort.

A particular concern for any sort method is its speed (i.e., how fast a particular sort completes its task). The speed with which an array of data members can be sorted is directly related to the number of comparisons and the number of exchanges that must be made. Related to the characteristic of speed is the notion of "best case" and "worst case" scenarios. For instance, a sort may have good speed given an average set of data, yet unacceptable speed given highly disordered data.

One technique for reducing the penalty incurred by exchanging full records is to employ a method that operates indirectly on a file, typically using an array of indices, with rearrangement done afterwards. In this manner, any of the above sorting methods may be adapted so that only n "exchanges" of full records are performed. One particular approach is to manipulate an index to the records, accessing the original array only for comparisons. In other words, it is more efficient to sort an index to the records than to incur the cost of moving large records around excessively.

Since all of the simple sorting techniques above execute in $n^2$ time, their usefulness for sorting files with a large number of records is limited. In other words, as the amount of data to be sorted increases, the execution speed of the technique becomes exponentially slower and, at some point, too slow to use. Thus, there has been great interest in developing improved techniques for sorting information. One of the best known improved sorting techniques is referred to as "quicksort," invented in 1960. Quicksort's popularity is due in large part to its ease of implementation and general applicability to a variety of situations. Based on the notion of exchange sorting, it adds the additional feature of "partitions."

With quicksort, a value or "comparand" is selected for partitioning the array into two parts. Those elements having a value greater than or equal to the partition value are stored on one side, while those having a value less than the partition value are stored on the other side. The process is repeated for each remaining part until the array is sorted, thus the process is essentially recursive. On the other hand, a recursive technique such as quicksort usually requires that a significant amount of stack-based memory be reserved. Moreover, this technique, which is particularly sensitive to long common substrings, exhibits nonlinear behavior.

Notwithstanding the wide variety of sorting techniques available today, many existing web-based applications are dependent upon back-end systems to perform the actual sorting operations. Although such sorting operations may include sorting of multiple columns, sorting of multiple data types, and even sorting by national locale, there is currently no convenient way of performing front-end, multi-column sorting, multi-data type sorting and/or sorting based on user characteristics (i.e., by locale).

SUMMARY

The foregoing discussed drawbacks and deficiencies of the prior art are overcome or alleviated by a method for implementing a front-end user sort request. In an exemplary embodiment, the method includes receiving a list request, decomposing the list request and creating a sort entry object using a list of column values initially retrieved from a data storage medium. A sort routine is performed on at least a first column of the list of column values in the sort entry object, wherein a compare function of the sort routine is dependent upon information obtained from decomposing the list request. The list request is rebuilt in accordance with the completion of the sort routine.

In another embodiment, a system for implementing a front-end user sort request includes a server configured for receiving a list request from a front-end device. The server further includes processing means for decomposing the list request and creating a sort entry object using a list of column values initially retrieved from a data storage medium. The processing means is further configured for performing a sort routine on at least a first column of the list of column values in the sort entry object, wherein a compare function of the sort routine is dependent upon information obtained from decomposing the list request, and rebuilding the list request in accordance with the completion of the sort routine.

BRIEF DESCRIPTION OF THE DRAWINGS

Referring to the exemplary drawings wherein like elements are numbered alike in the several Figures:

FIGS. 3(a) through 3(e) are data tables illustrating an exemplary multi-column sort operation using the method of FIG. 1.

DETAILED DESCRIPTION

Disclosed herein is a method and system for performing a flexible front-end multiple column and/or multiple data type sort without the need for re-accessing the source database itself. Briefly stated, an application (such as a web application) is provided with a front-end function for supporting multi-column and/or multi-data type sorting that does not rely on a database sort to satisfy user characteristics such as international collation. Thus, for example, an international user located in France may view a multiple colum list retrieved from a U.S. database that is sorted according to the French code page, even if the database itself provides sorted information according to the English code page.

Figure 1:
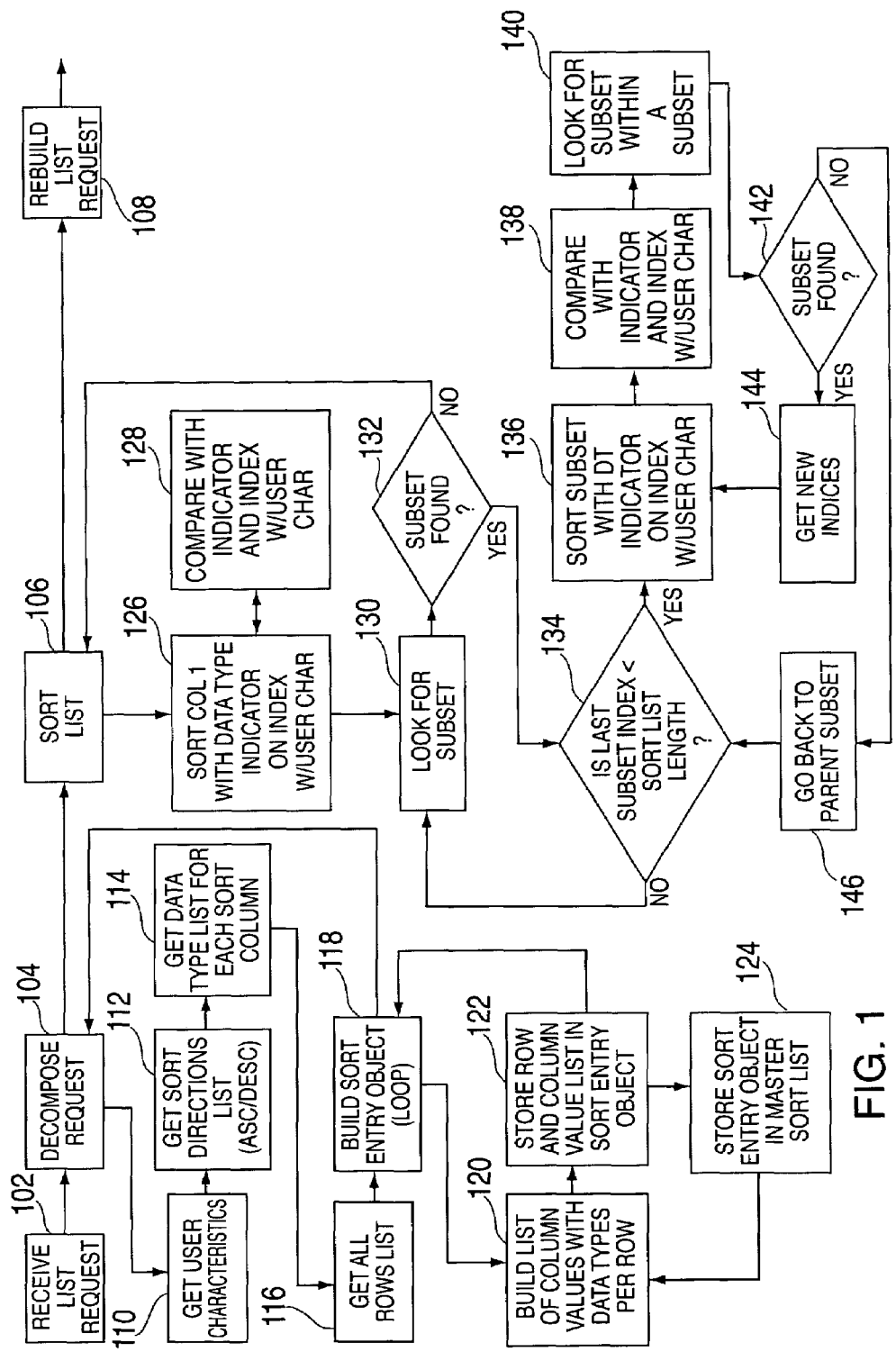
FIG. 1 is a block diagram illustrating a method for performing a flexible front-end sort operation, in accordance with an embodiment of the invention.

Referring initially to FIG. 1, there is shown a block diagram 100 illustrating a method for performing a flexible front-end sort operation, in accordance with an embodiment of the invention. Beginning at block 102, a list request is received (e.g., such as from a user or other front-end application). Instead of simply retrieving the requested information from the applicable storage medium (e.g., database) using whatever sort methodology is provided by the storage medium, the method first decomposes the list request, as indicated at block 104.

As is described in further detail hereinafter, based on the contents of the request (e.g., user characteristics, sort direction, data type list, etc.), a sort entry object is constructed from the storage medium data. In effect, the storage medium data is initially retrieved and "prepared" in a manner that allows for a flexible sorting of the data, depending on the particulars of the request. Thus, as shown in block 106, the data from the constructed sort entry object is sorted. The sort routines used for this sort will depend on what the data types are, whether the data is from multiple columns, and whether the initial list request includes user characteristics. Finally, once the sort is completed, the list request is rebuilt and returned to the requesting entity in the requested format, as shown in block 108.

Referring again to block 104 of FIG. 1, it will be seen that the request may include information such as user characteristics (e.g., language code, country code) as shown in block 110; a sort directions list (e.g., ascending, descending) that may vary from column to column as shown in block 112; and a data type list that may vary from column to column, as shown in block 114. Then, as shown in block 116, a list of each requested row is retrieved from the data storage medium and is used to build the sort entry object, as shown in block 118.

Figure 2:
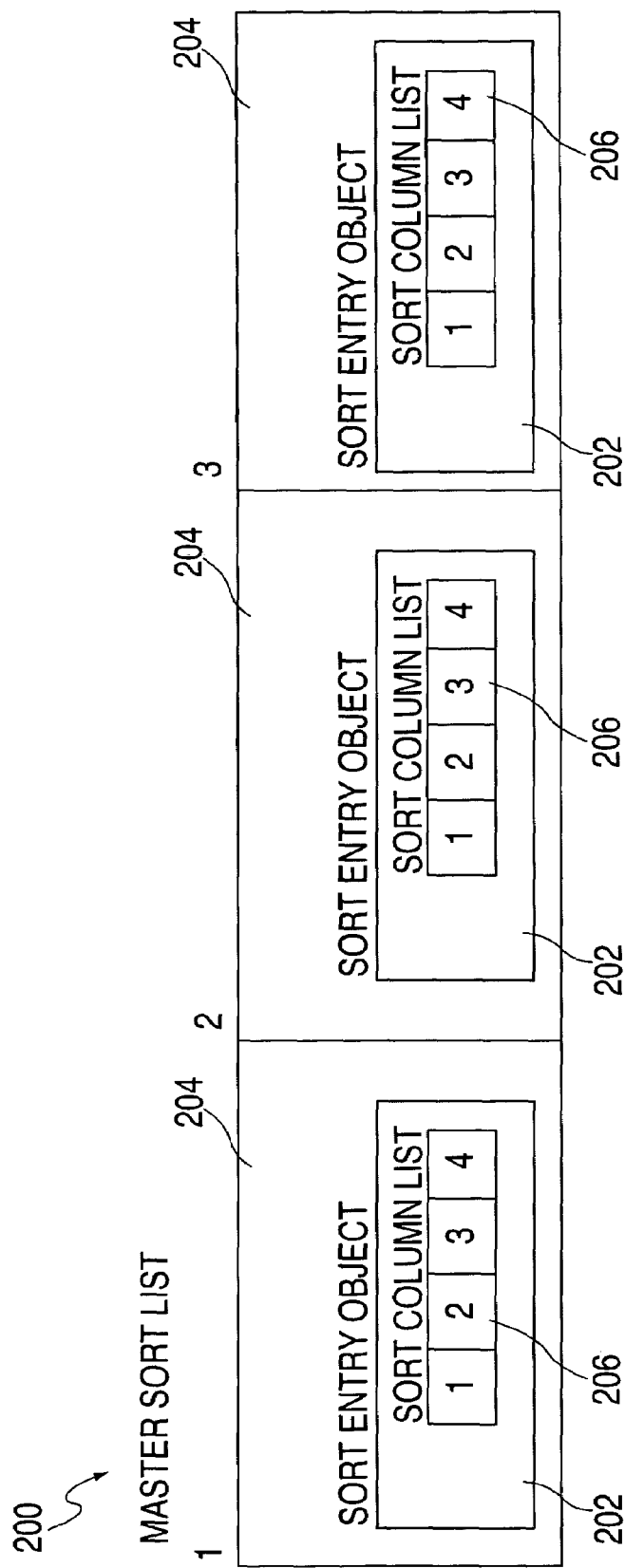
FIG. 2 is an exemplary structure for the master sort entry object list described in FIG. 1.

The construction of the sort entry object is a repetitive process that is completed when such an object for each row in the "all rows" list is complete. Thus, for each row, a list of column values (including data types per row, if applicable) is created, as shown at block 120. Then, this row and column value list is stored in a sort entry object, as indicated at block 122. Assuming there are multiple rows, there will be a corresponding number of sort entry objects (with one or more column values associated therewith). Accordingly, as a row and column value list is used to form a completed sort entry object, the completed sort entry object is itself stored in a master sort list, as indicated at block 124. Once a sort entry object is completed for each row, the process exits and returns to block 104, signifying the decomposition of the user/front-end application request is complete. An exemplary structure for the master sort list is illustrated in FIG. 2. As is shown, the master sort list 200 includes a separate sort entry object 202 for each row 204 from the initial list request. In turn, each sort entry object 202 includes a list of column values 206 per row and, where applicable, the data types associated therewith.

Presented below is an exemplary XML request object for constructing a sort object using the etcML framework of the CCT400 Presentation Layer:

```
public Sort createSort( ){
        Sort sort = etcML.createSort( );
        SortOrder sortOrder = etcML.createSortOrder( );
        Value value = etcML.createValue( );
        value.setValue("AuditTrail.id");
        sortOrder.setOperator(SQLGroupByOperatorType.ASC);
        sortOrder.setValue(value);
        sort.getSortOrder( ).add(sortOrder);
//      ****************************************
        SortOrder sortOrder2 = etcML.createSortOrder( );
        Value value2 = etcML.createValue( );
        value2.setValue("AuditTrail.modifyDateTime");
        sortOrder2.setOperator(SQLGroupByOperatorType.ASC);
        sortOrder2.setValue(value2);
        sort.getSortOrder( ).add(sortOrder2);
//      ****************************************
        SortOrder sortOrder3 = etcML.createSortOrder( );
        Value value3 = etcML.createValue( );
        value3.setValue("AuditTrail.columnName");
        sortOrder3.setOperator(SQLGroupByOperatorType.DESC);
        sortOrder3.setValue(value3);
        sort.getSortOrder( ).add(sortOrder3);
        return sort;
}
```

The first sort column entry will be considered the primary sort column. All other columns in the SortOrder object are considered secondary sorts to be used to break ties (i.e., compare matches) in the primary column. Secondary columns may not be used in all instances if there are no ties to be broken.

Sample XML Request:

```
<?xml version="1.0" encoding="UTF-8"?>
        <esm:esmML xmlns:xsi="http://www.w3.org/2001/XMLSchema-instance"
                xmlns:esm="http://www.ibm.com/esm"
                    xmlns:etcML="http://www.ibm.com/v1/etcML"
ID="1">        <Transactions>
<Request xsi:type="esm:ObjectRequestType" countryCode="US"
languageCode="en" timeZone="" esm:agentID="EXAV" esm:userTrace="false">
        <SystemID>eESM630</SystemID>
        <TransactionType>list</TransactionType>
        <Parameters xsi:type="esm:ParameterType">
                <etcML:RequestedFields>
                        <RequestedField>AuditTrail.Agent.id</RequestedField>
                        <RequestedField>AuditTrail.columnName</RequestedField>
                        <RequestedField>AuditTrail.modifyDateTime</RequestedField>
                </etcML:RequestedFields>
                <etcML:StartRow>1</etcML:StartRow>
                <etcML:DisplayRowCount>0</etcML:DisplayRowCount>
        </Parameters>
        <etcML:Filters operator="AND">
                <etcML:Filter key="AuditTrail.Agent.id" operator="Like">
                        <etcML:Value>B%</etcML:Value>
                </etcML:Filter>
        </etcML:Filters>
<etcML:Sort>
        <etcML:SortOrder operator="Ascending">
                <etcML:Value>AuditTrail.columnName</etcML:Value>
        </etcML:SortOrder>
        <etcML:SortOrder operator="Ascending">
            <etcML:Value>AuditTrail.modifyDateTime</etcML:Value>
        </etcML:SortOrder>
        <etcML:SortOrder operator="Descending">
                <etcML:Value>AuditTrail.Agent.id</etcML:Value>
        </etcML:SortOrder>
</etcML:Sort>
                <esm:TransactionTarget>AuditTrail</esm:TransactionTarget>
        </Request>
    </Transactions>
</esm:esmML>
```

Referring once again to FIG. 1, the Sort List routine (block 106) is responsible for the execution and accuracy of the multi-column sorting. In an exemplary embodiment, the underlying sort function is powered by a QuickSort algorithm. However, unlike a conventional QuickSort algorithm, the sort algorithm of the present method is written to handle an ArrayList (master list) of SortEntry Objects (i.e., multi-column sorting) as well the ability to use multiple Data Types.

The sort sequence begins with the ArrayList being sorted on the first column, as shown in block 126. Again, a data type indicator may be present, along with user characteristic information. If there is more than one sort column, the ArrayList will enter a multi-column sequence by beginning on the appropriate column index. The compare function of the support routine is dependent upon the data type indicator, any user characteristic information present and the index, as shown in block 128. A loop is then established from index 0 to the ArrayList size. The full ArrayList is sent to a function to find the first subset of duplicate rows found within the first column 1, as shown in block 130. Once the subset has been identified, the next column of that first identified subset will be used as the tiebreaker for the matching rows and will be sorted accordingly. It is noted that if no subsets are found from the first column, then there is no need for further sorting beyond column 1 and the sort process exits immediately, as reflected by decision block 132.

On the other hand, if an identified subset is greater than 2 and there exists more columns to sort, another sort loop is initiated to compare the entries from the children's children sets. The children's sort loop is exited once the index of the last subset matches the length of the sort list (i.e., the outer main sort loop's size is reached), as reflected in decision block 134. Until such time, the sort routine continues to block 136 to sort the current subset according to any data type indicator and user characteristic information available, and according to the current column index. As with the main sort routine of the first column, the subset sort routine compare operations are flexible, depending upon the data type indicator, any user characteristic information present, and the index, as shown in block 138. Furthermore, the present method continues to look for subsets within subsets, as shown in block 140, and if further subsets are present (decision block 142), new indices are received (block 144), and the sort subset routine is repeated. Otherwise, the routine returns to the parent subset, as shown in block 146. Eventually, all subsets in the master sort list are sorted and the entire sort subroutine is exited. The list request is then rebuilt as indicated previously and returned to the requester in the manner requested.

FIGS. 3(a) through 3(e) illustrate an exemplary sort operation as described above, wherein subsets within the master list data are discovered and a multi-colunm sort is implemented. In the example illustrated, the data initially retrieved from/stored within the storage medium (e.g., database, cache, etc.) is organized into three columns, the first two columns sorted in ascending order, while the third column is sorted in descending order. However, the new front-end request is for the data in the first column to be presented in ascending order, with both the second and third columns being sorted in descending order.

| Data Stored in cache: | New Request asks for: |
|---|---|
| Col 1 - ASC | Col 1 - ASC |
| Col 2 - ASC | Col 2 - DSC |
| Col 3 - DSC | Col 3 - DSC |

FIG. 3(a) summarizes the data as originally sorted/presented. Because the first column is already sorted in ascending order the initial sort will result in no swapping of any row entries. The routine will then proceed to look for a subset in column 1. As can be seen in FIG. 3(a), an immediate subset is discovered, since the first three rows all have the data value "1" stored in column 1 thereof. Accordingly, a sort subset routine is launched in which the first subset is further sorted by the values in column 2. Since column 2 is to be sorted in descending order, the compare function causes a swap between rows 3 and 1, as reflected in FIG. 3(b). Upon completion of the sorting of column 2 of the first column 1 subset, the routine will then look for another subset within column 2. Because another subset is present (column 2,rows 2-3), still another sort subset routine is launched for column 3. Again, since the new request calls for column 3to be sorted in descending order, it will be seen that row 2 will need to be swapped with row 3. This swap is shown in FIG. 3(c).

Following the swap of rows 2 and 3, the routine recognizes that the end of the first sort subset routine is reached and will thus return to column 1 to see if any further subsets are present beyond row 3. In the example illustrated, there is in fact another subset in column 1, namely row 4 through row 6, wherein a data value of "2" is present for each row. Once again, a new subset sort operation commences for column 2, which ultimately results in a swap of rows 6 and 4. This swap is shown in FIG. 3(d). Furthermore, because there is now another subset in column 2 (rows 5 and 6 ), there is a subset sort operation of column 3. In this instance, however, the subset sort operation of column 3 will not result a further row swap.

Finally, as shown in FIG. 3(e), the routine checks to see if there are any remaining subsets left in column 1, and finds another subset in rows 7 and 8. The resulting subset sort of rows 7-8, column 2 does not result in a row swap. There is, however a final subset in column 2, and therefore a subset sort of column 3takes place. The subset sort of rows 7-8, column 3 also does not result in a row swap. Because the sort list length has now been reached, the entire sort routine in this example is now complete. Thereafter, the newly sorted ArrayList is used to build a complete response object to send back the calling class. The construction function first creates an empty ObjectResponseType and fills that with the RowSetType information of the original response. Information including startRow, fetchCount, displayRowCount, maxRowCount and totalCount may be loaded as is into the new response object.

As indicated previously, if the initial list request is accompanied by user characteristic information, then the cache/database (multi-column and or multiple data type information) sorting may be based on the request's locale found in the xml header. Otherwise, if a locale is not provided then the locale will default to English (enUS). An advantage to the user characteristic information is that data originating from a U.S. location sorted by an English collation sequence may be resorted by the present method to suit the collation rules of another locale. For example, in the French alphabet, the accent marks associated with the characters can affect the sorting thereof.

The following list is sorted in accordance with an English collation sequence, as might be the case where the list is retrieved by a user from a U.S. based database or cache:

cote
coté
côte
côté

One the other hand, if the front-end user had requested that the records be ordered in accordance with a French collation sequence, then the proper ordering would be:

cote
côte
cotë
côtë

Because the collation sequence cannot be specified on a conventional database request, this is an undesirable limitation. Thus, through the use of the user characteristic information in the list request, the constructed sort entry object will include locale information that is in turn utilized by a modified compare function in the sort routine.

Figure 4:
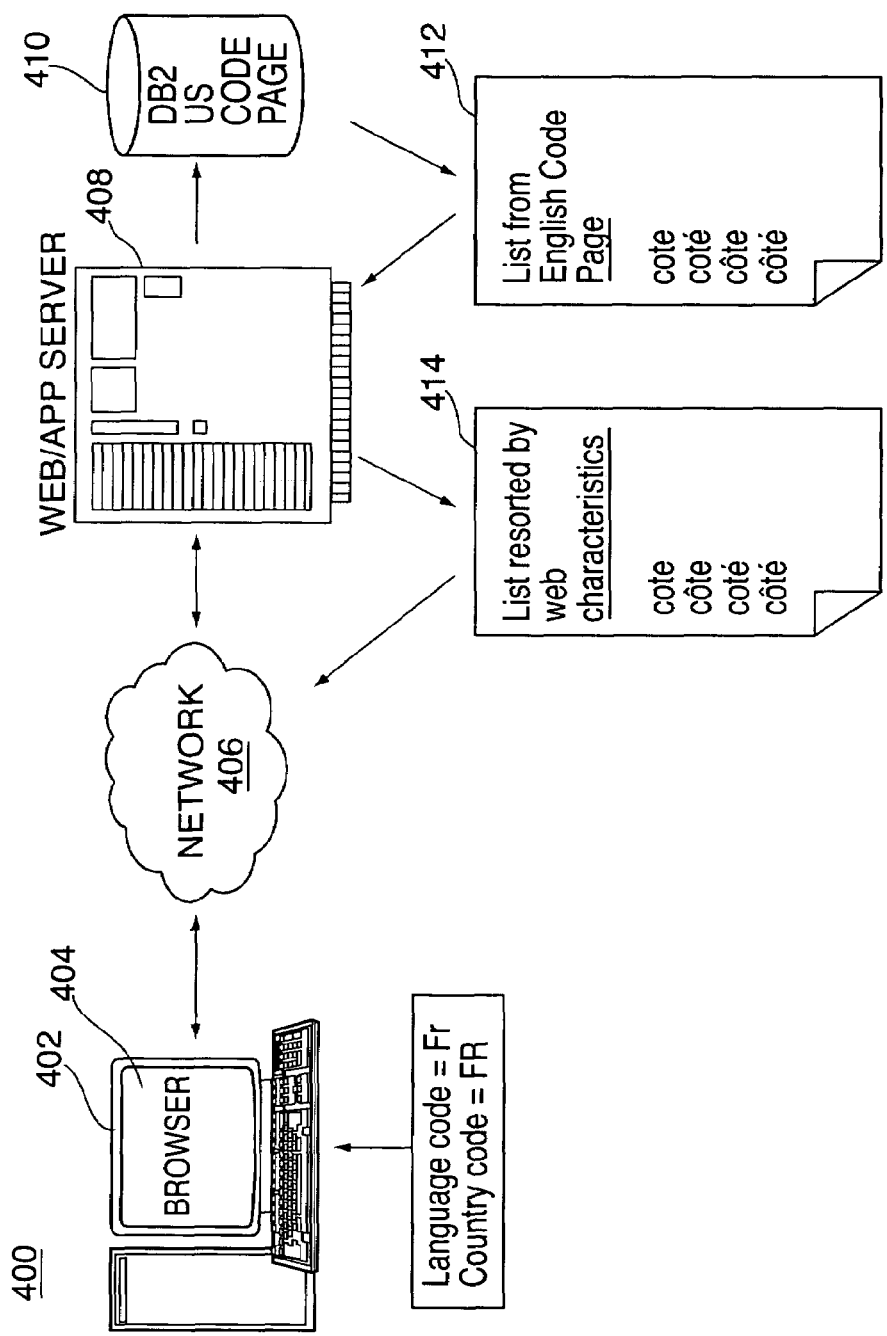
FIG. 4 is a schematic diagram illustrating a computerized system configured to provide a response to a user requested operation based upon user characteristics.

FIG. 4 is a schematic diagram illustrating a computerized system 400 in which the response to a user requested operation is based upon user characteristics (e.g., language code and country code). More particularly, a user submits a list request through a computer device 402 containing a browser 404 through a network 406 (e.g., internet). A server 408 (e.g., web server, application server, etc.) receives the list request from the browser 404, along with user characteristics. In the example illustrated, the user characteristics include language code=es (Spanish) and country code=ES (Spain). The server 408 then retrieves the requested data set from a storage entity such as database 410 installed as US, English. Using the exemplary list request described above, the list 412 retrieved from the database 410 is sorted in accordance with the English code. However, given that the user characteristics differ from the database locale/code, the retrieved list is resorted at the server level (according to the user characteristics) and a resorted list 414 then returned to the browser.

It should be appreciated that the application of system 400 is not limited to specific sort requests per se, but is equally applicable to other user requests (e.g., queries) in which the outcome of the request will change depending upon the locale of the user. As such, the reconfiguration of requested data is not only transparent to the user, but is received in a more efficient manner by avoiding re-accessing the corresponding data storage medium once the list is initially retrieved.

Finally, presented below is an example of a sample output using the above described methodology for requested data having 35 sortable columns.

EXAMPLE

Sample Output from Sort Extension using 35 sortable columns

Digits indicate Row Numbers

```
Entry in SortHelper:init()
Subset: !!!! Start Val:=0 Column Index:=0 For Loop Max:=50
0:=!!!!
Reset Start index to:=0
Subset: !!!!! Start Val:=1 Column Index:=0 For Loop Max:=50
1:=!!!!!
Reset Start index to:=1
Subset: !!!!!! Start Val:=2 Column Index:=0 For Loop Max:=50
2:=!!!!!!
Reset Start index to:=2
Subset: ??? Start Val:=3 Column Index:=0 For Loop Max:=50
3:=???
Reset Start index to:=3
Subset: ?????? Start Val:=4 Column Index:=0 For Loop Max:=50
4:=??????
Reset Start index to:=4
Subset:
??????????????????????????????????????????????????????????????????
??????? Start Val:=5 Column Index:=0 For Loop Max:=50
5:=???????????????????????????????????????????????????????????????????
??????????
6:=????????????????????????????????????????????????????????????????????
??????????
7:=????????????????????????????????????????????????????????????????????
??????????
8:=????????????????????????????????????????????????????????????????????
??????????
9:=????????????????????????????????????????????????????????????????????
??????????
Sorting Children in ascending fashion
Subset: 1 Start Val:=5 Column Index:=1 For Loop Max:=5
5:=1
6:=1
7:=1
```

```
Sorting Children in ascending fashion
Subset:   Start Val:=5 Column Index:=2 For Loop Max:=3
5:=
6:=
7:=
Sorting Children in ascending fashion
Subset: 0 Start Val:=5 Column Index:=3 For Loop Max:=3
5:=0
6:=0
7:=0
Sorting Children in ascending fashion
Subset: COMMUNICATIONS            Start Val:=5 Column Index:=4 For
Loop Max:=3
5:=COMMUNICATIONS
6:=COMMUNICATIONS
7:=COMMUNICATIONS
Sorting Children in ascending fashion
Subset: 1 Start Val:=5 Column Index:=5 For Loop Max:=3
5:=1
6:=1
7:=1
Sorting Children in ascending fashion
Subset: 1 Start Val:=5 Column Index:=6 For Loop Max:=3
5:=1
6:=1
7:=1
Sorting Children in ascending fashion
Subset: TestSystem 1              Start Val:=5 Column Index:=7 For
Loop Max:=3
5:=TestSystem 1
6:=TestSystem 1
7:=TestSystem 1
Sorting Children in ascending fashion
Subset: TestItem1a.a              Start Val:=5 Column Index:=8 For
Loop Max:=3
5:=TestItem1a.a
6:=TestItem1a.a
7:=TestItem1a.a
Sorting Children in ascending fashion
Subset: TestModul1a.a.a           Start Val:=5 Column Index:=9 For
Loop Max:=3
5:=TestModul1a.a.a
6:=TestModul1a.a.a
7:=TestModul1a.a.a
Sorting Children in ascending fashion
Subset:   Start Val:=5 Column Index:=10 For Loop Max:=3
5:=
6:=
7:=
Sorting Children in ascending fashion
Subset:   Start Val:=5 Column Index:=11 For Loop Max:=3
5:=
6:=
7:=
Sorting Children in ascending fashion
Subset:   Start Val:=5 Column Index:=12 For Loop Max:=3
5:=
```

```
6:=
7:=
Sorting Children in ascending fashion
Subset:  Start Val:=5 Column Index:=13 For Loop Max:=3
5:=
6:=
7:=
Sorting Children in ascending fashion
Subset:  Start Val:=5 Column Index:=14 For Loop Max:=3
5:=
6:=
7:=
Sorting Children in ascending fashion
Subset:  Start Val:=5 Column Index:=15 For Loop Max:=3
5:=
6:=
7:=
Sorting Children in ascending fashion
Subset: GROUP A OWN                     Start Val:=5 Column Index:=16 For
Loop Max:=3
5:=GROUP A OWN
6:=GROUP A OWN
7:=GROUP A OWN
Sorting Children in ascending fashion
Subset:  Start Val:=5 Column Index:=17 For Loop Max:=3
5:=
6:=
7:=
Sorting Children in ascending fashion
Subset:  Start Val:=5 Column Index:=18 For Loop Max:=3
5:=
6:=
7:=
Sorting Children in ascending fashion
Subset:  Start Val:=5 Column Index:=19 For Loop Max:=3
5:=
6:=
7:=
Sorting Children in ascending fashion
Subset:  Start Val:=5 Column Index:=20 For Loop Max:=3
5:=
6:=
7:=
Sorting Children in ascending fashion
Subset:  Start Val:=5 Column Index:=21 For Loop Max:=3
5:=
6:=
7:=
Sorting Children in ascending fashion
Subset: USERA3                          Start Val:=5 Column Index:=22 For
Loop Max:=3
5:=USERA3
6:=USERA3
7:=USERA3
Sorting Children in ascending fashion
Subset: A3 Start Val:=5 Column Index:=23 For Loop Max:=3
5:=A3
```

```
6:=A3
7:=A3
Sorting Children in ascending fashion
Subset: Person Start Val:=5 Column Index:=24 For Loop Max:=3
5:=Person
6:=Person
7:=Person
Sorting Children in ascending fashion
Subset:  Start Val:=5 Column Index:=25 For Loop Max:=3
5:=
6:=
7:=
Sorting Children in ascending fashion
Subset: GROUP A OWN                 Start Val:=5 Column Index:=26 For
Loop Max:=3
5:=GROUP A OWN
6:=GROUP A OWN
7:=GROUP A OWN
Sorting Children in ascending fashion
Subset:  Start Val:=5 Column Index:=27 For Loop Max:=3
5:=
6:=
7:=
Sorting Children in ascending fashion
Subset:                             Start Val:=5 Column Index:=28 For
Loop Max:=3
5:=
6:=
7:=
Sorting Children in ascending fashion
Subset:                             Start Val:=5 Column Index:=29 For
Loop Max:=3
5:=
6:=
7:=
Sorting Children in ascending fashion
Subset: JTeam 10                    Start Val:=5 Column Index:=30 For
Loop Max:=3
5:=JTeam 10
6:=JTeam 10
7:=JTeam 10
Sorting Children in ascending fashion
Subset:  Start Val:=5 Column Index:=31 For Loop Max:=3
5:=
6:=
7:=
Sorting Children in ascending fashion
Subset:  Start Val:=5 Column Index:=32 For Loop Max:=3
5:=
6:=
7:=
Sorting Children in ascending fashion
Subset:  Start Val:=5 Column Index:=33 For Loop Max:=3
5:=
6:=
7:=
Sorting Children in ascending fashion
```

```
Subset: 2 Start Val:=8 Column Index:=1 For Loop Max:=5
8:=2
9:=2
Sorting Children in ascending fashion
Subset:  Start Val:=8 Column Index:=2 For Loop Max:=2
8:=
9:=
Sorting Children in ascending fashion
Subset: 0 Start Val:=8 Column Index:=3 For Loop Max:=2
8:=0
9:=0
Sorting Children in ascending fashion
Subset: COMMUNICATIONS               Start Val:=8 Column Index:=4 For
Loop Max:=2
8:=COMMUNICATIONS
9:=COMMUNICATIONS
Sorting Children in ascending fashion
Subset: 1 Start Val:=8 Column Index:=5 For Loop Max:=2
8:=1
9:=1
Sorting Children in ascending fashion
Subset: 1 Start Val:=8 Column Index:=6 For Loop Max:=2
8:=1
9:=1
Sorting Children in ascending fashion
Subset: TestSystem 1                 Start Val:=8 Column Index:=7 For
Loop Max:=2
8:=TestSystem 1
9:=TestSystem 1
Sorting Children in ascending fashion
Subset: TestItem1a.a                 Start Val:=8 Column Index:=8 For
Loop Max:=2
8:=TestItem1a.a
9:=TestItem1a.a
Sorting Children in ascending fashion
Subset: TestModul1a.a.a              Start Val:=8 Column Index:=9 For
Loop Max:=2
8:=TestModul1a.a.a
9:=TestModul1a.a.a
Sorting Children in ascending fashion
Subset:  Start Val:=8 Column Index:=10 For Loop Max:=2
8:=
9:=
Sorting Children in ascending fashion
Subset:  Start Val:=8 Column Index:=11 For Loop Max:=2
8:=
9:=
Sorting Children in ascending fashion
Subset:  Start Val:=8 Column Index:=12 For Loop Max:=2
8:=
9:=
Sorting Children in ascending fashion
Subset:  Start Val:=8 Column Index:=13 For Loop Max:=2
8:=
9:=
Sorting Children in ascending fashion
```

```
Subset: SUPPORTS_ALL               Start Val:=8 Column Index:=14 For
Loop Max:=2
8:=SUPPORTS_ALL
9:=SUPPORTS_ALL
Sorting Children in ascending fashion
Subset: EXAV                       Start Val:=8 Column Index:=15 For
Loop Max:=2
8:=EXAV
9:=EXAV
Sorting Children in ascending fashion
Subset: GROUP A OWN                Start Val:=8 Column Index:=16 For
Loop Max:=2
8:=GROUP A OWN
9:=GROUP A OWN
Sorting Children in ascending fashion
Subset:  Start Val:=8 Column Index:=17 For Loop Max:=2
8:=
9:=
Sorting Children in ascending fashion
Subset:  Start Val:=8 Column Index:=18 For Loop Max:=2
8:=
9:=
Sorting Children in ascending fashion
Subset:  Start Val:=8 Column Index:=19 For Loop Max:=2
8:=
9:=
Sorting Children in ascending fashion
Subset:  Start Val:=8 Column Index:=20 For Loop Max:=2
8:=
9:=
Sorting Children in ascending fashion
Subset:  Start Val:=8 Column Index:=21 For Loop Max:=2
8:=
9:=
Sorting Children in ascending fashion
Subset: USERA3                     Start Val:=8 Column Index:=22 For
Loop Max:=2
8:=USERA3
9:=USERA3
Sorting Children in ascending fashion
Subset: A3 Start Val:=8 Column Index:=23 For Loop Max:=2
8:=A3
9:=A3
Sorting Children in ascending fashion
Subset: Person Start Val:=8 Column Index:=24 For Loop Max:=2
8:=Person
9:=Person
Sorting Children in ascending fashion
Subset:  Start Val:=8 Column Index:=25 For Loop Max:=2
8:=
9:=
Sorting Children in ascending fashion
Subset: GROUP A OWN                Start Val:=8 Column Index:=26 For
Loop Max:=2
8:=GROUP A OWN
9:=GROUP A OWN
Sorting Children in ascending fashion
```

```
Subset:    Start Val:=8 Column Index:=27 For Loop Max:=2
8:=
9:=
Sorting Children in ascending fashion
Subset:                             Start Val:=8 Column Index:=28 For
Loop Max:=2
8:=
9:=
Sorting Children in ascending fashion
Subset:                             Start Val:=8 Column Index:=29 For
Loop Max:=2
8:=
9:=
Sorting Children in ascending fashion
Subset: JTeam 10                    Start Val:=8 Column Index:=30 For
Loop Max:=2
8:=JTeam 10
9:=JTeam 10
Sorting Children in ascending fashion
Subset:    Start Val:=8 Column Index:=31 For Loop Max:=2
8:=
9:=
Sorting Children in ascending fashion
Subset:    Start Val:=8 Column Index:=32 For Loop Max:=2
8:=
9:=
Sorting Children in ascending fashion
Subset:    Start Val:=8 Column Index:=33 For Loop Max:=2
8:=
9:=
Sorting Children in ascending fashion
Subset: 0.49181295234865297testDesc Start Val:=10 Column Index:=0 For
Loop Max:=50
10:=0.49181295234865297testDesc
Reset Start index to:=10
Subset:
12345678910111213141516171819202122232425262728293031323334353637383940414243441424344 Start Val:=11 Column Index:=0 For Loop Max:=50
11:=123456789101112131415161718192021222324252627282930313233343536373839404142434344
Reset Start index to:=11
Subset:
12345678910111213141516171819202122232425262728293031323334353637383940414243444434244 Start Val:=12 Column Index:=0 For Loop Max:=50
12:=123456789101112131415161718192021222324252627282930313233343536373839404142434444
13:=123456789101112131415161718192021222324252627282930313233343536373839404142434444
14:=123456789101112131415161718192021222324252627282930313233343536373839404142434444
Sorting Children in ascending fashion
Subset: 1 Start Val:=12 Column Index:=1 For Loop Max:=3
12:=1
13:=1
14:=1
Sorting Children in ascending fashion
Subset:    Start Val:=12 Column Index:=2 For Loop Max:=3
```

```
12:=
13:=
14:=
Sorting Children in ascending fashion
Subset: 0 Start Val:=12 Column Index:=3 For Loop Max:=3
12:=0
13:=0
14:=0
Sorting Children in ascending fashion
Subset: COMMUNICATIONS            Start Val:=12 Column Index:=4 For
Loop Max:=3
12:=COMMUNICATIONS
13:=COMMUNICATIONS
14:=COMMUNICATIONS
Sorting Children in ascending fashion
Subset: 2 Start Val:=12 Column Index:=5 For Loop Max:=3
12:=2
13:=2
14:=2
Sorting Children in ascending fashion
Subset: 2 Start Val:=12 Column Index:=6 For Loop Max:=3
12:=2
13:=2
14:=2
Sorting Children in ascending fashion
Subset: TestSystem 1              Start Val:=12 Column Index:=7 For
Loop Max:=3
12:=TestSystem 1
13:=TestSystem 1
14:=TestSystem 1
Sorting Children in ascending fashion
Subset:                           Start Val:=12 Column Index:=8 For
Loop Max:=3
12:=
13:=
14:=
Sorting Children in ascending fashion
Subset:                           Start Val:=12 Column Index:=9 For
Loop Max:=3
12:=
13:=
14:=
Sorting Children in ascending fashion
Subset:  Start Val:=12 Column Index:=10 For Loop Max:=3
12:=
13:=
14:=
Sorting Children in ascending fashion
Subset:  Start Val:=12 Column Index:=11 For Loop Max:=3
12:=
13:=
14:=
Sorting Children in ascending fashion
Subset:  Start Val:=12 Column Index:=12 For Loop Max:=3
12:=
13:=
14:=
```

```
Sorting Children in ascending fashion
Subset:  Start Val:=12 Column Index:=13 For Loop Max:=3
12:=
13:=
14:=
Sorting Children in ascending fashion
Subset:  Start Val:=12 Column Index:=14 For Loop Max:=3
12:=
13:=
14:=
Sorting Children in ascending fashion
Subset: EXAV                             Start Val:=12 Column Index:=15
For Loop Max:=3
12:=EXAV
13:=EXAV
14:=EXAV
Sorting Children in ascending fashion
Subset: BIGBLUE                          Start Val:=12 Column Index:=16
For Loop Max:=3
12:=BIGBLUE
13:=BIGBLUE
14:=BIGBLUE
Sorting Children in ascending fashion
Subset:  Start Val:=12 Column Index:=17 For Loop Max:=3
12:=
13:=
14:=
Sorting Children in ascending fashion
Subset:  Start Val:=12 Column Index:=18 For Loop Max:=3
12:=
13:=
14:=
Sorting Children in ascending fashion
Subset:  Start Val:=12 Column Index:=19 For Loop Max:=3
12:=
13:=
14:=
Sorting Children in ascending fashion
Subset:  Start Val:=12 Column Index:=20 For Loop Max:=3
12:=
13:=
14:=
Sorting Children in ascending fashion
Subset:  Start Val:=12 Column Index:=21 For Loop Max:=3
12:=
13:=
14:=
Sorting Children in ascending fashion
Subset: EXAV                             Start Val:=12 Column Index:=22
For Loop Max:=3
12:=EXAV
13:=EXAV
14:=EXAV
Sorting Children in ascending fashion
Subset: EXAV Start Val:=12 Column Index:=23 For Loop Max:=3
12:=EXAV
13:=EXAV
```

```
14:=EXAV
Sorting Children in ascending fashion
Subset: Description modified on Apr  Start Val:=12 Column Index:=24 For
Loop Max:=3
12:=Description modified on Apr
13:=Description modified on Apr
14:=Description modified on Apr
Sorting Children in ascending fashion
Subset:  Start Val:=12 Column Index:=25 For Loop Max:=3
12:=
13:=
14:=
Sorting Children in ascending fashion
Subset: SUPPORTS_ALL              Start Val:=12 Column Index:=26
For Loop Max:=3
12:=SUPPORTS_ALL
13:=SUPPORTS_ALL
14:=SUPPORTS_ALL
Sorting Children in ascending fashion
Subset:                                          Start Val:=12
Column Index:=27 For Loop Max:=3
12:=
13:=
14:=
Sorting Children in ascending fashion
Subset:  Start Val:=12 Column Index:=28 For Loop Max:=3
12:=
13:=
14:=
Sorting Children in ascending fashion
Subset:  Start Val:=12 Column Index:=29 For Loop Max:=3
12:=
13:=
14:=
Sorting Children in ascending fashion
Subset: AAANoOrg                  Start Val:=12 Column Index:=30
For Loop Max:=3
12:=AAANoOrg
13:=AAANoOrg
14:=AAANoOrg
Sorting Children in ascending fashion
Subset:  Start Val:=12 Column Index:=31 For Loop Max:=3
12:=
13:=
14:=
Sorting Children in ascending fashion
Subset:  Start Val:=12 Column Index:=32 For Loop Max:=3
12:=
13:=
14:=
Sorting Children in ascending fashion
Subset:  Start Val:=12 Column Index:=33 For Loop Max:=3
12:=
13:=
14:=
Sorting Children in ascending fashion
```

```
Subset:
12345678910111213141516171819202122232425262728293031323334353637383940 4
1424344454647484950 Start Val:=15 Column Index:=0 For Loop Max:=50
15:=12345678910111213141516171819202122232425262728293031323334353637383
9404142434445464748 4950
Reset Start index to:=15
Subset: 1 test 36002 Start Val:=16 Column Index:=0 For Loop Max:=50
16:=1 test 36002
Reset Start index to:=16
Subset: 2 Start Val:=17 Column Index:=0 For Loop Max:=50
17:=2
Reset Start index to:=17
Subset: 2 test 36002 Start Val:=18 Column Index:=0 For Loop Max:=50
18:=2 test 36002
Reset Start index to:=18
Subset: 3 Start Val:=19 Column Index:=0 For Loop Max:=50
19:=3
Reset Start index to:=19
Subset: 3 test 36002 Start Val:=20 Column Index:=0 For Loop Max:=50
20:=3 test 36002
Reset Start index to:=20
Subset: 433-6227 Start Val:=21 Column Index:=0 For Loop Max:=50
21:=433-6227
Reset Start index to:=21
Subset: 4 test 36002 Start Val:=22 Column Index:=0 For Loop Max:=50
22:=4 test 36002
Reset Start index to:=22
Subset: 5 test 36002 Start Val:=23 Column Index:=0 For Loop Max:=50
23:=5 test 36002
Reset Start index to:=23
Subset: 63 origin test Start Val:=24 Column Index:=0 For Loop Max:=50
24:=63 origin test
Reset Start index to:=24
Subset: 7ui7u Start Val:=25 Column Index:=0 For Loop Max:=50
25:=7ui7u
Reset Start index to:=25
Subset: A Start Val:=26 Column Index:=0 For Loop Max:=50
26:=A
Reset Start index to:=26
Subset: Ab Start Val:=27 Column Index:=0 For Loop Max:=50
27:=Ab
Reset Start index to:=27
Subset: Abhiman - Problem for test Start Val:=28 Column Index:=0 For
Loop Max:=50
28:=Abhiman - Problem for test
29:=Abhiman - Problem for test
Sorting Children in ascending fashion
Subset: 0 Start Val:=28 Column Index:=1 For Loop Max:=2
28:=0
29:=0
Sorting Children in ascending fashion
Subset:  Start Val:=28 Column Index:=2 For Loop Max:=2
28:=
29:=
Sorting Children in ascending fashion
Subset: 0 Start Val:=28 Column Index:=3 For Loop Max:=2
28:=0
```

```
29:=0
Sorting Children in ascending fashion
Subset:    Start Val:=28 Column Index:=4 For Loop Max:=2
28:=
29:=
Sorting Children in ascending fashion
Subset: 2 Start Val:=28 Column Index:=5 For Loop Max:=2
28:=2
29:=2
Sorting Children in ascending fashion
Subset: 2 Start Val:=28 Column Index:=6 For Loop Max:=2
28:=2
29:=2
Sorting Children in ascending fashion
Subset: Sys_Org_A                    Start Val:=28 Column Index:=7 For
Loop Max:=2
28:=Sys_Org_A
29:=Sys_Org_A
Sorting Children in ascending fashion
Subset: A_C1_Item1                   Start Val:=28 Column Index:=8 For
Loop Max:=2
28:=A_C1_Item1
29:=A_C1_Item1
Sorting Children in ascending fashion
Subset: A_C1_I1_Mod1                 Start Val:=28 Column Index:=9 For
Loop Max:=2
28:=A_C1_I1_Mod1
29:=A_C1_I1_Mod1
Sorting Children in ascending fashion
Subset: EXAV                         Start Val:=28 Column Index:=10
For Loop Max:=2
28:=EXAV
29:=EXAV
Sorting Children in ascending fashion
Subset: EXAV Start Val:=28 Column Index:=11 For Loop Max:=2
28:=EXAV
29:=EXAV
Sorting Children in ascending fashion
Subset: Description modified on Apr Start Val:=28 Column Index:=12 For
Loop Max:=2
28:=Description modified on Apr
29:=Description modified on Apr
Sorting Children in ascending fashion
Subset:    Start Val:=28 Column Index:=13 For Loop Max:=2
28:=
29:=
Sorting Children in ascending fashion
Subset: Group Org_B                  Start Val:=28 Column Index:=14
For Loop Max:=2
28:=Group Org_B
29:=Group Org_B
Sorting Children in ascending fashion
Subset: EXAV                         Start Val:=28 Column Index:=15
For Loop Max:=2
28:=EXAV
29:=EXAV
Sorting Children in ascending fashion
```

```
Subset:   Start Val:=28 Column Index:=16 For Loop Max:=2
28:=
29:=
Sorting Children in ascending fashion
Subset: EXAV                          Start Val:=28 Column Index:=17
For Loop Max:=2
28:=EXAV
29:=EXAV
Sorting Children in ascending fashion
Subset: EXAV Start Val:=28 Column Index:=18 For Loop Max:=2
28:=EXAV
29:=EXAV
Sorting Children in ascending fashion
Subset: Description modified on Apr Start Val:=28 Column Index:=19 For
Loop Max:=2
28:=Description modified on Apr
29:=Description modified on Apr
Sorting Children in ascending fashion
Subset:   Start Val:=28 Column Index:=20 For Loop Max:=2
28:=
29:=
Sorting Children in ascending fashion
Subset: SUPPORTS_ALL                  Start Val:=28 Column Index:=21
For Loop Max:=2
28:=SUPPORTS_ALL
29:=SUPPORTS_ALL
Sorting Children in ascending fashion
Subset: EXAV                          Start Val:=28 Column Index:=22
For Loop Max:=2
28:=EXAV
29:=EXAV
Sorting Children in ascending fashion
Subset: EXAV Start Val:=28 Column Index:=23 For Loop Max:=2
28:=EXAV
29:=EXAV
Sorting Children in ascending fashion
Subset: Description modified on Apr Start Val:=28 Column Index:=24 For
Loop Max:=2
28:=Description modified on Apr
29:=Description modified on Apr
Sorting Children in ascending fashion
Subset:   Start Val:=28 Column Index:=25 For Loop Max:=2
28:=
29:=
Sorting Children in ascending fashion
Subset: SUPPORTS_ALL                  Start Val:=28 Column Index:=26
For Loop Max:=2
28:=SUPPORTS_ALL
29:=SUPPORTS_ALL
Sorting Children in ascending fashion
Subset:   Start Val:=28 Column Index:=27 For Loop Max:=2
28:=
29:=
Sorting Children in ascending fashion
Subset:   Start Val:=28 Column Index:=28 For Loop Max:=2
28:=
29:=
```

```
Sorting Children in ascending fashion
Subset:  Start Val:=28 Column Index:=29 For Loop Max:=2
28:=
29:=
Sorting Children in ascending fashion
Subset:  Start Val:=28 Column Index:=30 For Loop Max:=2
28:=
29:=
Sorting Children in ascending fashion
Subset:  Start Val:=28 Column Index:=31 For Loop Max:=2
28:=
29:=
Sorting Children in ascending fashion
Subset:  Start Val:=28 Column Index:=32 For Loop Max:=2
28:=
29:=
Sorting Children in ascending fashion
Subset:  Start Val:=28 Column Index:=33 For Loop Max:=2
28:=
29:=
Sorting Children in ascending fashion
Subset: Abhiman - Test for setting occurred date to current date Start
Val:=30 Column Index:=0 For Loop Max:=50
30:=Abhiman - Test for setting occurred date to current date
31:=Abhiman - Test for setting occurred date to current date
Sorting Children in ascending fashion
Subset: 1 Start Val:=30 Column Index:=1 For Loop Max:=2
30:=1
31:=1
Sorting Children in ascending fashion
Subset: CHILD                            Start Val:=30 Column Index:=2 For
Loop Max:=2
30:=CHILD
Reset Start index to:=30
Subset:  Start Val:=31 Column Index:=2 For Loop Max:=2
31:=
Reset Start index to:=31
Subset: ABhiman Testing problem 11 Start Val:=32 Column Index:=0 For
Loop Max:=50
32:=ABhiman Testing problem 11
Reset Start index to:=32
Subset: Abhiman - Test Problem Start Val:=33 Column Index:=0 For Loop
Max:=50
33:=Abhiman - Test Problem
34:=Abhiman - Test Problem
35:=Abhiman - Test Problem
Sorting Children in ascending fashion
Subset: 0 Start Val:=33 Column Index:=1 For Loop Max:=3
33:=0
34:=0
35:=0
Sorting Children in ascending fashion
Subset:  Start Val:=33 Column Index:=2 For Loop Max:=3
33:=
34:=
35:=
Sorting Children in ascending fashion
```

```
Subset: 0 Start Val:=33 Column Index:=3 For Loop Max:=3
33:=0
34:=0
35:=0
Sorting Children in ascending fashion
Subset:  Start Val:=33 Column Index:=4 For Loop Max:=3
33:=
34:=
35:=
Sorting Children in ascending fashion
Subset: 2 Start Val:=33 Column Index:=5 For Loop Max:=3
33:=2
34:=2
35:=2
Sorting Children in ascending fashion
Subset: 2 Start Val:=33 Column Index:=6 For Loop Max:=3
33:=2
34:=2
35:=2
Sorting Children in ascending fashion
Subset: Sys_Org_A                  Start Val:=33 Column Index:=7 For
Loop Max:=3
33:=Sys_Org_A
34:=Sys_Org_A
35:=Sys_Org_A
Sorting Children in ascending fashion
Subset: A_C1_Item1                 Start Val:=33 Column Index:=8 For
Loop Max:=3
33:=A_C1_Item1
34:=A_C1_Item1
35:=A_C1_Item1
Sorting Children in ascending fashion
Subset: A_C1_I1_Mod1               Start Val:=33 Column Index:=9 For
Loop Max:=3
33:=A_C1_I1_Mod1
34:=A_C1_I1_Mod1
35:=A_C1_I1_Mod1
Sorting Children in ascending fashion
Subset: EXAV                       Start Val:=33 Column Index:=10
For Loop Max:=3
33:=EXAV
34:=EXAV
35:=EXAV
Sorting Children in ascending fashion
Subset: EXAV Start Val:=33 Column Index:=11 For Loop Max:=3
33:=EXAV
34:=EXAV
35:=EXAV
Sorting Children in ascending fashion
Subset: Description modified on Apr Start Val:=33 Column Index:=12 For
Loop Max:=3
33:=Description modified on Apr
34:=Description modified on Apr
35:=Description modified on Apr
Sorting Children in ascending fashion
Subset:  Start Val:=33 Column Index:=13 For Loop Max:=3
33:=
```

```
34:=
35:=
Sorting Children in ascending fashion
Subset: Group Org_B                      Start Val:=33 Column Index:=14
For Loop Max:=3
33:=Group Org_B
34:=Group Org_B
35:=Group Org_B
Sorting Children in ascending fashion
Subset: EXAV                             Start Val:=33 Column Index:=15
For Loop Max:=3
33:=EXAV
34:=EXAV
35:=EXAV
Sorting Children in ascending fashion
Subset:   Start Val:=33 Column Index:=16 For Loop Max:=3
33:=
34:=
35:=
Sorting Children in ascending fashion
Subset: EXAV                             Start Val:=33 Column Index:=17
For Loop Max:=3
33:=EXAV
34:=EXAV
35:=EXAV
Sorting Children in ascending fashion
Subset: EXAV Start Val:=33 Column Index:=18 For Loop Max:=3
33:=EXAV
34:=EXAV
35:=EXAV
Sorting Children in ascending fashion
Subset: Description modified on Apr Start Val:=33 Column Index:=19 For
Loop Max:=3
33:=Description modified on Apr
34:=Description modified on Apr
35:=Description modified on Apr
Sorting Children in ascending fashion
Subset:   Start Val:=33 Column Index:=20 For Loop Max:=3
33:=
34:=
35:=
Sorting Children in ascending fashion
Subset: SUPPORTS_ALL                     Start Val:=33 Column Index:=21
For Loop Max:=3
33:=SUPPORTS_ALL
34:=SUPPORTS_ALL
35:=SUPPORTS_ALL
Sorting Children in ascending fashion
Subset: EXAV                             Start Val:=33 Column Index:=22
For Loop Max:=3
33:=EXAV
34:=EXAV
35:=EXAV
Sorting Children in ascending fashion
Subset: EXAV Start Val:=33 Column Index:=23 For Loop Max:=3
33:=EXAV
34:=EXAV
```

```
35:=EXAV
Sorting Children in ascending fashion
Subset: Description modified on Apr Start Val:=33 Column Index:=24 For
Loop Max:=3
33:=Description modified on Apr
34:=Description modified on Apr
35:=Description modified on Apr
Sorting Children in ascending fashion
Subset:  Start Val:=33 Column Index:=25 For Loop Max:=3
33:=
34:=
35:=
Sorting Children in ascending fashion
Subset: SUPPORTS_ALL                    Start Val:=33 Column Index:=26
For Loop Max:=3
33:=SUPPORTS_ALL
34:=SUPPORTS_ALL
35:=SUPPORTS_ALL
Sorting Children in ascending fashion
Subset:  Start Val:=33 Column Index:=27 For Loop Max:=3
33:=
34:=
35:=
Sorting children in ascending fashion
Subset:  Start Val:=33 Column Index:=28 For Loop Max:=3
33:=
34:=
35:=
Sorting Children in ascending fashion
Subset:  Start Val:=33 Column Index:=29 For Loop Max:=3
33:=
34:=
35:=
Sorting Children in ascending fashion
Subset:  Start Val:=33 Column Index:=30 For Loop Max:=3
33:=
34:=
35:=
Sorting Children in ascending fashion
Subset:  Start Val:=33 Column Index:=31 For Loop Max:=3
33:=
34:=
35:=
Sorting Children in ascending fashion
Subset:  Start Val:=33 Column Index:=32 For Loop Max:=3
33:=
34:=
35:=
Sorting Children in ascending fashion
Subset:  Start Val:=33 Column Index:=33 For Loop Max:=3
33:=
34:=
35:=
Sorting Children in ascending fashion
Subset: Abhiman - Test Problem2 Start Val:=36 Column Index:=0 For Loop
Max:=50
36:=Abhiman - Test Problem2
```

```
Reset Start index to:=36
Subset: Abhiman - Test Problem3 Start Val:=37 Column Index:=0 For Loop
Max:=50
37:=Abhiman - Test Problem3
38:=Abhiman - Test Problem3
Sorting Children in ascending fashion
Subset: 0 Start Val:=37 Column Index:=1 For Loop Max:=2
37:=0
38:=0
Sorting Children in ascending fashion
Subset:  Start Val:=37 Column Index:=2 For Loop Max:=2
37:=
38:=
Sorting Children in ascending fashion
Subset: 0 Start Val:=37 Column Index:=3 For Loop Max:=2
37:=0
38:=0
Sorting Children in ascending fashion
Subset:  Start Val:=37 Column Index:=4 For Loop Max:=2
37:=
38:=
Sorting Children in ascending fashion
Subset: 2 Start Val:=37 Column Index:=5 For Loop Max:=2
37:=2
38:=2
Sorting Children in ascending fashion
Subset: 2 Start Val:=37 Column Index:=6 For Loop Max:=2
37:=2
38:=2
Sorting Children in ascending fashion
Subset: Sys_Org_A                    Start Val:=37 Column Index:=7 For
Loop Max:=2
37:=Sys_Org_A
38:=Sys_Org_A
Sorting Children in ascending fashion
Subset: A_C1_Item1                   Start Val:=37 Column Index:=8 For
Loop Max:=2
37:=A_C1_Item1
38:=A_C1_Item1
Sorting Children in ascending fashion
Subset: A_C1_I1_Mod1                 Start Val:=37 Column Index:=9 For
Loop Max:=2
37:=A_C1_I1_Mod1
38:=A_C1_I1_Mod1
Sorting Children in ascending fashion
Subset: EXAV                         Start Val:=37 Column Index:=10
For Loop Max:=2
37:=EXAV
38:=EXAV
Sorting Children in ascending fashion
Subset: EXAV Start Val:=37 Column Index:=11 For Loop Max:=2
37:=EXAV
38:=EXAV
Sorting Children in ascending fashion
Subset: Description modified on Apr Start Val:=37 Column Index:=12 For
Loop Max:=2
37:=Description modified on Apr
```

```
38:=Description modified on Apr
Sorting Children in ascending fashion
Subset:      Start Val:=37 Column Index:=13 For Loop Max:=2
37:=
38:=
Sorting Children in ascending fashion
Subset: Group Org_B                      Start Val:=37 Column Index:=14
For Loop Max:=2
37:=Group Org_B
38:=Group Org_B
Sorting Children in ascending fashion
Subset: EXAV                             Start Val:=37 Column Index:=15
For Loop Max:=2
37:=EXAV
38:=EXAV
Sorting Children in ascending fashion
Subset:      Start Val:=37 Column Index:=16 For Loop Max:=2
37:=
38:=
Sorting Children in ascending fashion
Subset: EXAV                             Start Val:=37 Column Index:=17
For Loop Max:=2
37:=EXAV
38:=EXAV
Sorting Children in ascending fashion
Subset: EXAV Start Val:=37 Column Index:=18 For Loop Max:=2
37:=EXAV
38:=EXAV
Sorting Children in ascending fashion
Subset: Description modified on Apr Start Val:=37 Column Index:=19 For
Loop Max:=2
37:=Description modified on Apr
38:=Description modified on Apr
Sorting Children in ascending fashion
Subset:      Start Val:=37 Column Index:=20 For Loop Max:=2
37:=
38:=
Sorting Children in ascending fashion
Subset: SUPPORTS_ALL                     Start Val:=37 Column Index:=21
For Loop Max:=2
37:=SUPPORTS_ALL
38:=SUPPORTS_ALL
Sorting Children in ascending fashion
Subset: EXAV                             Start Val:=37 Column Index:=22
For Loop Max:=2
37:=EXAV
38:=EXAV
Sorting Children in ascending fashion
Subset: EXAV Start Val:=37 Column Index:=23 For Loop Max:=2
37:=EXAV
38:=EXAV
Sorting Children in ascending fashion
Subset: Description modified on Apr Start Val:=37 Column Index:=24 For
Loop Max:=2
37:=Description modified on Apr
38:=Description modified on Apr
Sorting Children in ascending fashion
```

```
Subset:   Start Val:=37 Column Index:=25 For Loop Max:=2
37:=
38:=
Sorting Children in ascending fashion
Subset: SUPPORTS_ALL                    Start Val:=37 Column Index:=26
For Loop Max:=2
37:=SUPPORTS_ALL
38:=SUPPORTS_ALL
Sorting Children in ascending fashion
Subset:   Start Val:=37 Column Index:=27 For Loop Max:=2
37:=
38:=
Sorting Children in ascending fashion
Subset:   Start Val:=37 Column Index:=28 For Loop Max:=2
37:=
38:=
Sorting Children in ascending fashion
Subset:   Start Val:=37 Column Index:=29 For Loop Max:=2
37:=
38:=
Sorting Children in ascending fashion
Subset:   Start Val:=37 Column Index:=30 For Loop Max:=2
37:=
38:=
Sorting Children in ascending fashion
Subset:   Start Val:=37 Column Index:=31 For Loop Max:=2
37:=
38:=
Sorting Children in ascending fashion
Subset:   Start Val:=37 Column Index:=32 For Loop Max:=2
37:=
38:=
Sorting Children in ascending fashion
Subset:   Start Val:=37 Column Index:=33 For Loop Max:=2
37:=
38:=
Sorting Children in ascending fashion
Subset: Abhiman - Test Problem5 Start Val:=39 Column Index:=0 For Loop
Max:=50
39:=Abhiman - Test Problem5
Reset Start index to:=39
Subset: Abhiman - Test Problem6 Start Val:=40 Column Index:=0 For Loop
Max:=50
40:=Abhiman - Test Problem6
Reset Start index to:=40
Subset: Abhiman - Test Problem7 Start Val:=41 Column Index:=0 For Loop
Max:=50
41:=Abhiman - Test Problem7
Reset Start index to:=41
Subset: Abhiman - Test Problem9 Start Val:=42 Column Index:=0 For Loop
Max:=50
42:=Abhiman - Test Problem9
Reset Start index to:=42
Subset: Abhiman - Test Problem on Thursday Start Val:=43 Column Index:=0
For Loop Max:=50
43:=Abhiman - Test Problem on Thursday
Reset Start index to:=43
```

```
Subset: Abhiman - Test Problem to compare with CCT Start Val:=44 Column
Index:=0 For Loop Max:=50
44:=Abhiman - Test Problem to compare with CCT
Reset Start index to:=44
Subset: ADDINFO TEST - 22:40:00  - New call Start Val:=45 Column
Index:=0 For Loop Max:=50
45:=ADDINFO TEST - 22:40:00  - New call
Reset Start index to:=45
Subset: ASASASA Start Val:=46 Column Index:=0 For Loop Max:=50
46:=ASASASA
Reset Start index to:=46
Subset: ASDFASDFASDF Start Val:=47 Column Index:=0 For Loop Max:=50
47:=ASDFASDFASDF
Reset Start index to:=47
Subset:  fsfsdf Start Val:=48 Column Index:=0 For Loop Max:=50
48:= fsfsdf
Reset Start index to:=48
Subset:  Start Val:=49 Column Index:=0 For Loop Max:=50
49:=
Reset Start index to:=49
Total Calls to QS: 206
```

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for implementing a front-end user sort request, the method comprising:

receiving an XML list request object;

decomposing said XML list request object in cache and repetitively creating a sort entry object in said cache for each row included in said XML list request object using a list of column values initially retrieved from a data storage medium and prepared for use in a set of sort entry objects in said cache, with each sort entry object including a row and one or more column values associated with the row;

creating a master sort entry object list in said cache containing each of said created sort entry objects, wherein the master sort entry object list includes a separate sort entry object for each row corresponding to said XML list request object;

performing a sort routine on at least a first column of said list of colunm values in each of said sort entry objects in said cache, wherein a compare function of said sort routine is dependent upon information obtained from said decomposing said list request, said sort routing further comprising:

determining the existence of one or more parent subsets within said first colunm of said list of column values in each of said sort entry objects; and sorting each parent subset within said first colunm using colunm values from a next most significant column, wherein a compare function used for sorting said next most significant column is based upon user characteristics included in said sort entry objects, a sort directions list, and a data type list for each of said number of columns corresponding to said list request;

rebuilding said XML list request object in accordance with the completion of said sort routine; and returning configured data to a front-end user in accordance with said user characteristics.

2. The method of claim 1, wherein said information obtained from said decomposing said XML list request object further comprises at least one of: user characteristics, a sort directions list, and a data type list for each of a number of columns corresponding to said list request.

3. The method of claim 1, further comprising:

upon completion of sorting a given parent subset, determining the existence of one or more child subsets within said given parent subset and sorting each determined child subset; and upon completion of sorting of each of said determined child subsets, returning to the colunm containing said given parent subset to determine whether any further parent subsets are present.

4. The method of claim 1, wherein said sort routine is based on a quicksort algorithm having a compare function thereof modified in accordance with said information obtained from said decomposing said list request.

5. A system for implementing a front-end user sort request, comprising:

a server configured for receiving an XML list request object from a front-end device;

said server further including processing means for:

decomposing said XML list request object in cache and repetitively creating a sort entry object in said cache for each row included in said list request using a list of column values initially retrieved from a data storage medium and prepared for use in a set of sort entry objects in said cache, with each sort entry object including a row and one or more column values associated with the row;

creating a master sort entry object list in said cache containing each of said created sort entry objects, wherein the master sort entry object list includes a separate sort entry object for each row corresponding to said XML list request object;

performing a sort routine on at least a first colunm of said list of column values in each of said sort entry objects, wherein a compare function of said sort routine is dependent upon information obtained from said decomposing said XML list request object, said sort routing further comprising:

determining the existence of one or more parent subsets within said first column of said list of column values in each of said sort entry objects; and sorting each parent subset within said first column using column values from a next most significant column, wherein a compare function used for sorting said next most significant column is based upon user characteristics included in said sort entry objects, a sort directions list, and a data type list for each of said number of columns corresponding to said XML list request object; and rebuilding said list request in accordance with the completion of said sort routine.

6. The system of claim 5, wherein said information obtained by said server from said decomposing said XML list request object further comprises at least one of: user characteristics, a sort directions list, and a data type list for each of a number of columns corresponding to said list request.

* * * * *